United States Patent Office 3,443,053
Patented May 6, 1969

3,443,053
METHOD OF JOINING METALLIC OBJECTS OF DIFFERENT MELTING POINTS
Edwin J. Luetzow, Logansport, Ind., assignor to Switches Incorporated, a corporation of Indiana
No Drawing. Continuation-in-part of application Ser. No. 502,610, Oct. 22, 1965. This application Sept. 29, 1966, Ser. No. 583,081
Int. Cl. B23k 11/16
U.S. Cl. 219—57
11 Claims

ABSTRACT OF THE DISCLOSURE

Electrical wires such as aluminum are joined to connector elements of lower melting point in fatigue resistant composites which exhibit substantially no voltage drop through the connection by a method wherein a higher melting point, for example, aluminum wire, is brought into physical contact with a lower melting point connector element. Electrical conducting electrodes in contact with the metals cause electrical current to flow and the aluminum wire to heat due to higher contact resistance. When the aluminum wire reaches a temperature higher than the melting point of the connector element, the local area of the element in contact with the wire is rendered molten and the pressure exerted by the electrodes cause the wire to displace the molten metal. Upon cooling of the molten metal, the wire is embedded and securely joined in the lower melting point connector element.

---

This application is a continuation-in-part of my application Ser. No. 502,610, filed Oct. 22, 1965, now abandoned, and entitled Article of Manufacture and Method of Producing Same.

This invention relates in general to the preparation of composites of metallic elements. More particularly, it relates to joining of light metals such as aluminum with other metallic materials. Still more particularly, it relates to a new and novel procedure for resistance welding of aluminum wire to elements of zinc.

The articles of manufactured of this invention are composites of metallic elements, welded together by a method involving heating of the higher melting point material to a temperature such that upon contact of the higher melting point object with the other metallic object which has been maintained in a relatively cool state, localized melting will be induced in the area of contact and exerting mechanical pressure whereby the lower melting point metal will be displaced by flowing around the edge of the higher melting point material, such as aluminum wire being advanced to the desired degree of penetration into the lower melting point metallic material.

Light materials such as aluminum, for example, in wire form, are known to have good electrical conductivity and strength combined with low weight. However, processes adapted to join aluminum to other materials have presented numerous problems. The inability to use conventional soldering methods especially with respect to rosin flux and soft solders to join aluminum wire has essentially prevented their extensive use in fields where the advantages suggest their use. Pure zinc is generally regarded as the most corrosion resistant soldering metal for joining aluminum but has not been widely adopted owing to its poor flow properties. Another process known as aluminum brazing requires temperatures so close to the melting point of aluminum that control so as to obtain uniform results have been almost impossible. In addition, when electrical conductor members of aluminum are maintained in contact with other conductor materials, there is generally continuous and objectionable increase in the resistance to current flow at the interface between the contacting surfaces.

Still another problem that arises in this field has been the inadequacies of the formable joints between aluminum wire and elements of different metals such as terminal connections of copper. Aluminum oxide on the surface of aluminum wire tenaciously adheres to the wire surface and becomes a part of the bonding zone matrix tending to render the bonding zone brittle and to increase resistivity to passage of electrical current. When the union is not made with a matrix formed by melting portions of the elements but is simply made by crimping, oxide inhibiting paste is required in the crimped joint to prevent buildup of aluminum oxide-current flow inhibiting layers at the metal interface.

In addition to the difficulties in forming said joints, to the extent that aluminum wire is well joined to an element of different metal, difficulties arise from galvanic corrosion since there can exist a potential difference between the aluminum and the element of different metal.

Numerous efforts to overcome the disadvantages have been made in the past, for example, by casting a compound ingot of, for example, copper around an aluminum core, by "tining" or "cladding" freshly cleaned aluminum wire, often in an operation conducted in an inert atmosphere, with a zinc layer to simplify subsequent soldering, the cladding being designed to prevent formation of an aluminum oxide layer, by abrasion of the surface of aluminum under conditions such as the aluminum being immersed in molten zinc, and the like.

Now a method has been developed for the preparation of multicomponent metallic composites of particular advantage when at least one component is a light metal subject to the handicap of forming adherent stable oxide layers, which composites exhibit substantially no voltage drop through the connection, minimize galvanic corrosion and form relatively high tensile bonds. In a specific embodiment of the composites wherein aluminum wire is joined to a zinc element, in addition to the above improved characteristics, composites are substantially free of thermal stresses due to the similarity of the expansion coefficients of these metals.

The method of preparing such composites comprises bringing a higher melting point metallic solid into surface contact with a lower melting point metallic object, the surface contact area of said higher melting point metallic solid with said lower melting point metallic solid being a small proportion of the area of the latter, heating said higher melting point metallic solid to a temperature in the range between the melting points of the two metals, exerting mechanical pressure on said metallic object in a direction forcing contact therebetween and maintaining the pressure whereby the heated portion of the higher melting point metallic object induces melting of the area of the lower melting point metal contacted thereby and displaces the melted portion of the lower melting point metallic object, terminating the heating and maintaining the applied pressure on the metals until the metals cool to solidify the molten lower melting point metal and to lock said higher melting point metallic solid in the embedded position.

As illustrated herein by reference to aluminum wire as representative of metals which normally have associated therewith a tenacious surface layer of metal oxide and a zinc connector or terminal element, the method preferably consists of preferentially heating the aluminum wire, i.e., the higher melting point material, to a temperature higher than the melting point of zinc while these metals are in direct contact, exerting mechanical pressure so that the hot aluminum wire is forced into or penetrates into the zinc element as by forging, the forging pressure causing the hot aluminum wire to displace zinc melted in the contact area and then cooling the composite so that the molten zinc solidifies to lock the aluminum wire in the position to which it advanced or penetrated into the zinc element.

The composite wire articles provided by this invention may be viewed as a multiplicity, i.e., two or more metallic elements joined rendering them useful in an electrical circuit. Such composites may take many forms, for example, an electrical conductor joined to a lower melting point metallic terminal such as aluminum wire joined to zinc terminals, or two similar electrical conductors joined through a connector such as aluminum wire joined to aluminum wire through a zinc connection, or different metal conductors joined through a connector such as aluminum wire joined to copper wire through a zinc connection, tantalum joined to copper wire, magnesium joined to a zinc plate, or three metallic elements, each element being joined to an element of lower melting point, and the like. The type of composite having new found utility is an aluminum wire with a zinc terminal useful as electrical connector for a starter winding.

These composites possess properties which were not predictable until the technique of manufacture was perfected. Such properties being a strong bond or joint having a tensile strength greater than that of the aluminum wire itself, low resistivity to passage of electrical current, elimination of the possibility of joint failure due to thermal stress, and low contact potential, i.e., no appreciable galvanic corrosion, whereby in normal operation the more electropositive metal sacrifices itself.

The low contact potential of a composite of this invention, such as aluminum and zinc, is unusual. Measured by the conventional contact potential method, an aluminum-zinc joint shows a work potential between zinc and aluminum of 3.40 minus 3.38 or 0.02 volt compared to a work potential between zinc and copper of 1.67 volts. This is in marked distinction to the work potential predictable from the electromotive series where the potential difference between aluminum and zinc and between aluminum and copper are both relatively large. The potential differences between aluminum and zinc being 0.9 volt and that between aluminum and copper being even higher.

In general, one embodiment of the composites of this invention may be prepared by a method wherein:

A, for example, wire and a lower melting point metallic element are juxtaposed in the holder of an AC resistance spot welding machine with a low inertia upper electrode mechanism for good weld followup. This machine should be equipped with suitable heat and precision cycle time controls. Such a machine is the Taylor Winfield EB1 welder with a 5 kva. transformer and a synchronous precision heat control.

The wire to be heated is contacted by a resistive tungsten electrode for preferential heating of the wire while the lower melting point element is contacted by a highly conductive electrode such as copper so that the electrical conductivity is high and the electrical current is passed without appreciable rise in temperature of the lower melting point metallic element. When the wire has been heated to a temperature in the range between the melting points of the metals, in the instance of zinc and aluminum, between about 786° F. (about 419° C.) and about 1218° F. (about 659° C.), preferably between about 500° C. and 625° C., pressure is exerted on the wire so that the wire is advanced into contact with the lower melting point metallic element and forced into the element so as to displace melted metal in the contacted zone.

The preferential heating of the higher melting point metal to a temperature higher than the melting point of the metal to which it is to be joined, is influenced by the type and configuration of electrode used to contact the metals to be joined and secondarily, by the direction of electrical current flow. Localized heating may be accomplished by use of a resistive electrode such as a tungsten-copper alloy electrode. This heating is accentuated when direction of current flow is from the electrode to the workpiece.

When a resistive electrode is used to contact the higher melting point metal, and a highly conductive electrode is used to contact the lower melting point metallic element, heating is confined predominantly, i.e., localized, in the high melting point metal and the lower melting point metallic element remains relatively cool except in the area where there is direct contact between the two metals.

When the higher melting point metal attains a temperature higher than the melting point of the other metal, which temperature is attained quickly with resistance welding equipment, melting in a localized area of the lower melting point metallic element is effected. At this point, if pressure is applied to the higher melting point object, the latter is caused to displace the metal.

Mechanical pressure may be applied to effect this forging action through the electrode. This action may be accomplished in various ways such as spring loading, pneumatic means or hydraulic means. In general, apparatus capable of creating pressures in the range between about 50 and 450 pounds ram pressure are sufficient for most purposes. For forging zinc and aluminum elements, pressures in the range between about 75 and 150 pounds ram pressure are sufficient.

After the higher melting point metallic object has been pressured into displacing the localized molten area of the lower melting point metallic element, the molten area must be solidified to lock the higher melting point metallic object in place before the pressure is released if a strong joint is to be insured. Holding the contacting metals in the atmosphere for a few seconds after the electric current is shut off is usually sufficient to allow removal of the composite from the welding apparatus.

In another embodiment of the invention, a copper wire and a lower melting point metallic welding lug may be juxtaposed in a crimping machine adapted to fold the lug and double it back on itself so that the wire is held within the fold. Such a fold may be accomplished by a mechanical forming operation prior to heating or the crimping may be performed by the pressure of the electrodes during the heating cycle.

In performing the heating operation required for this embodiment of the invention, an AC resistance spot welding machine with a low inertia upper electrode mechanism is altered to have both electrodes adapted with high resistance electrodes.

When the electrodes contact the lug which is doubled back so that the wire is trapped in the fold, and welding current is initiated, the wire, due to constriction resistance resulting from the small cross-sectional area, is quickly heated. The electrical current is passed without appreciable rise in temperature of the lower melting point metallic element. The U-shaped lug does not shunt the weld, for example, when the lug is zinc metal and the wire is aluminum, because the specific resistance of zinc is low relative to good conductors such as copper, and the specific conductivity of aluminum is considerably higher than zinc, so that a greater portion of the welding current will pass through the aluminum.

When the wire has been heated to a temperature in the range between the melting point of the metals, in the instance of zinc and aluminum, i.e., between 786° F. and 1218° F., pressure is exerted on the U-shaped lug so that the opposed faces of the lug are forced closer together. As the legs of the U-shaped lug are passed into contact with the wire heated above the melting point of the lug metal, localized melting occurs in the contacted areas. The applied pressure causes the molten metal to be displaced and resistance to closing the gap between the legs of the U-shaped lug is removed.

After the higher melting point metallic object is embedded to an appreciable depth into both legs of the U-shaped lug, the molten area is cooled and solidified to lock the higher melting point metallic object in place.

This embodiment of the invention produces a joint of enhanced mechanical strength and provides wire support for those applications that operate in vibration or shock environments.

The invention will be bettter understood from the following examples which are given by way of illustration, but without any intention that the invention be limited thereto.

EXAMPLE I

In welding a No. 15 "EC" aluminum wire to a 1" long, 1/4" wide zinc plate of approximately 0.05" thickness, an approximately 1/4" length of stripped aluminum wire is brought into contact with the plate. A resistance tungsten heating electrode (Mallory 100W) is brought into contact with the stripped aluminum wire on the opposite side from the contact with the zinc plate. The tungsten electrode is adapted with a spring loading and a mechanical pressure of approximately 125 pounds is applied.

The zinc plate rests on a copper button electrode (Mallory 10W3) situated in the lower electrode holder. When current is passed through the wire by this machine, the aluminum wire is quickly heated to a temperature which peaks at approximately 600° C. Under these conditions of temperature and applied pressure, zinc in the area contacted by the hot aluminum wire is melted and the aluminum wire displaces the molten material so that the zinc flows out around the wire taking with it at least some of the aluminum oxide on the surface of the wire. Either upon terminating the passage of electric current or by other appropriate means such as changing the current direction flow, etc., heating is terminated and upon cooling, the aluminum wire is securely locked in the embedded position.

Tensile strength of the joint formed by the procedure of Example I is generally in the range of 25 to 28 pounds determined by axial pull.

The fatigue resistance of this joint of Example I was determined by thermal cycling, i.e., heating the composite by passage of electric current while the surrounding atmosphere was maintained at various temperatures in the range between −75° C. and +350° C. A further test was carried out at 38° C. in 95% relative humidity.

The current density used to obtain the rapid temperature rise was 50,000 amperes per square inch operating in accordance with the Ohm's Law formula known as $I^2R$. The millivolt drop across the joint was used to monitor the test. This data was taken with null potentiometer at a current density of 2000 amperes per square inch. The cycle time was one minute total with an on time of two seconds. Each test was cycled for 150,000 cycles. No evidence of a joint failure due to increased joint resistance was shown in any of the preceding tests.

EXAMPLE II

In welding a No. 15 "EC" aluminum wire and a No. 12 "EC" aluminum wire to a zinc element having a lug 1/2" long, 3/8" wide and 1/16" thick, an approximately 3/8" of the length of each stripped wire is brought into contact with the lug.

Approximately 3/8 of an inch of the lug is bent back on itself and crimped tight to secure the two wires in the fold between the two legs of the thus formed U-shaped lug.

Upper and lower high resistance welding electrodes (Mallory 10W3) are brought into contact with legs of the U-shaped lug and a mechanical pressure of approximately 150 pounds is applied.

When current is passed from the electrodes through the two legs of the zinc lug and the wires in the fold, the aluminum wire is quickly heated to a temperature of about 580° C. Under these conditions of temperature and applied pressure, zinc, in the areas contacted by the hot aluminum wires, is melted, thus removing the resistance to closure of the gap between the two legs of the lug. Under the pressure exerted, the distance between the two opposed surfaces of the two legs of the lug is shortened to, for example, 1/64", i.e., a distance less than the length of the diameter of the aluminum wires.

During the operation which shortens the distance between the legs of the lug, the zinc in the areas contacted by the hot aluminum wires is melted and the aluminum wires displace the molten material so that the zinc flows out around each wire. Upon terminating the passage of electrical current, the composite cools and the aluminum wires are each securely locked in the embedded positions.

Tensile strengths of the joint formed by the procedures of this example may be in the range of 30 to 35 pounds determined by axial pull.

The foregoing detailed description is given for clearness of understanding only and no unnecessary limitations should be understood therefrom, for modifications will be obvious to those skilled in the art.

I claim:

1. The method of joining solid metallic objects of different melting points which comprises bringing a higher melting point metallic solid into surface contact with a lower melting point metallic object, the surface contact area of said higher melting point metallic solid with said lower melting point metallic solid being a small proportion of the area of the latter, heating said higher melting point metallic solid to a temperature in the range between the melting points of the two metals, exerting mechanical pressure in the non-swaging range between 50 pounds and 450 pounds ram pressure on said metallic objects in a direction forcing contact therebetween and maintaining the pressure whereby the heated portion of the higher melting point metallic object induces melting of the area of the lower melting point metal contacted thereby and displaces the melted portion of the lower melting point metallic object, terminating the heating and maintaining the applied pressure on the metals until the metals cool to solidify the molten lower melting point metal and to lock said higher melting point metallic solid in the embedded position.

2. The method of joining solid metallic objects of different melting points which comprises bringing a higher melting point metallic solid into surface contact over a relatively small area with a lower melting point metallic object of relatively large surface area, heating said higher melting point metallic solid to a temperature in the range between the melting points of the two metals, said heat being electrically generated and localized by contact of a resistance heating electrode with that portion of the higher melting point metallic object which is in contact with said object of larger area while the latter is in contact with a highly conductive electrode, exerting mechanical pressure in the non-swaging range between 50 pounds and 450 pounds ram pressure on said heated portion of said metallic object of higher melting point in a direction forcing contact with the surface of the lower melting point metallic object whereby the heated portion of the higher melting point metallic object induces melting of the lower melting point metallic object in the contacted area, terminating the heating and cooling the composite before the applied pressure is released to solidify the melted lower melting point metal contacting the higher melting point object and to lock said contact area of the higher melting point metallic solid in the embedded position.

3. The method of joining solid metallic objects according to claim 2 wherein the higher melting point solid consists of two spaced portions of aluminum conductors and the lower melting point metallic object is a zinc connector element.

4. The method of joining solid metallic objects according to claim 2 wherein the higher melting point solid consists of an aluminum conductor and a copper element and the lower melting point metallic object is a zinc connector element.

5. The method of joining solid metallic objects according to claim 2 wherein the higher melting point solid consists of an aluminum conductor and the lower melting point metallic object is a zinc terminal for an electrical wire conductor.

6. The method of joining solid metallic objects of different melting points which comprises bringing a higher melting point metallic object of relatively small cross-sectional thickness into surface contact over a relatively small area with a lower melting point metallic object of considerably larger surface area, applying pressure to the end portion of said larger surface area to create a folded back end with the higher melting point metallic object positioned between the initial contact area and the folded back portion of the area, heating said higher melting point metallic solid to a temperature in the range between the melting points of the two metals, exerting mechanical pressure on the outer surfaces of the folded back lower melting point metallic object and maintaining said pressure thereon whereby contact of the heated portion of the higher melting point metallic object induces melting of that portion of the lower melting point metallic object which is directly contacted, continuing the pressure so that heated higher melting point metallic object displaces the melted portion of the lower melting point metallic object as the opposing surfaces of the folded area of lower melting point metallic object are forced into positions where the distance sepaarting said surfaces is less than the cross-sectional thickness of said higher melting point metallic object, terminating the heating and cooling the metals to solidify the melted lower melting point metal and to lock said higher melting point metallic object in the embedded position.

7. The method of joining aluminum wire to the lug of a zinc connector which comprises bringing the aluminum wire into surface contact with said lug, bending the end portion of the lug back on itself until it contacts said aluminum wire, heating the aluminum wire to a temperature above the melting point of zinc, said heat being electrically generated under conditions to preferentially heat the aluminum due to the higher specific conductivity thereof, exerting mechanical pressure on the outer surfaces of the lug and its doubled back end portion and maintaining the pressure thereon whereby the heated aluminum wire induces melting of the areas of the lug contacted by said wire, continuing the pressure so that the hot aluminum wire displaces the melted portion of the zinc lug in the wire contacted areas as the opposing surfaces of the folded portions of said lug are forced into a position where the distance separating said surfaces is less than the diameter of the wire, terminating the heating, and then cooling the composite to solidify the melted zinc and to lock said aluminum wire in the embedded position.

8. The method of joining aluminum wire to zinc plate elements which comprises bringing a section of bare aluminum wire into surface contact with a zinc plate, preferentially heating the portion of aluminum wire contacting said plate to a temperature in the range between about 500° C. and 625° C., said heat being electrically generated and localized by contact of a resistance heating electrode with said section of bare aluminum wire while the plate is in contact with a conductive electrode, exerting mechanical pressure on said heated portion of aluminum wire in a direction forcing contact with the surface of said zinc plate whereby the hot aluminum wire induces melting of the zinc with which it is in contact and displaces the melted zinc in the contacted area, terminating passage of electric current and cooling the composite before the applied pressure is released to solidify the melted zinc in contact with the aluminum wire and to lock said wire in the embedded position.

9. The method according to claim 8 wherein the mechanical pressure exerted is between about 75 pounds and 150 pounds ram pressure.

10. The method according to claim 1 wherein the metallic material of lowest melting point is joined at spaced points in independent operations with a metallic object and a metallic element, said object and element both having a melting point higher than that of the metallic material acting as a connector.

11. The method according to claim 10 wherein the material of lower melting point is a zinc connector, one of the higher melting point material is an aluminum wire and the other higher melting point material is a copper element.

References Cited

UNITED STATES PATENTS

| 1,415,524 | 5/1922 | Carrico | 219—117 |
| 2,560,678 | 7/1951 | Wirt | 219—117 |
| 3,015,020 | 12/1961 | Long | 219—79 |
| 3,100,254 | 8/1963 | Perkins | 219—58 |
| 3,175,070 | 3/1965 | Elliott et al. | 219—118 X |
| 3,297,855 | 1/1967 | Bowers | 219—117 X |
| 910,434 | 1/1909 | Thompson | 219—118 |
| 2,179,545 | 11/1939 | Edge et al. | 219—58 |
| 2,734,118 | 2/1956 | Patten | 219—93 |

OTHER REFERENCES

"Resistance Welding Aluminum and Its Alloys," supplement to the Journal of the American Welding Society, July 1940, by W. Sparagen and G. E. Claussen, page 270-S.

RICHARD M. WOOD, *Primary Examiner.*

B. A. STEIN, *Assistant Examiner.*

U.S. Cl. X.R.

29—497.5; 219—117, 118